United States Patent
Skuse (10) Patent No.: US 11,408,459 B2
(45) Date of Patent: Aug. 9, 2022

(54) HEIGHT ADJUSTABLE WALKING AID

(71) Applicant: Brian Skuse, Boston, MA (US)

(72) Inventor: Brian Skuse, Boston, MA (US)

(73) Assignee: Upperstate LLC, Boston, MA (US)

( * ) Notice: Subject to any disclaimer, the term of this patent is extended or adjusted under 35 U.S.C. 154(b) by 367 days.

(21) Appl. No.: 16/828,543

(22) Filed: Mar. 24, 2020

(65) Prior Publication Data
US 2021/0301856 A1 Sep. 30, 2021

(51) Int. Cl.
*A45B 9/00* (2006.01)
*F16B 21/12* (2006.01)

(52) U.S. Cl.
CPC .............. *F16B 21/12* (2013.01); *A45B 9/00* (2013.01); *A45B 2009/007* (2013.01); *A45B 2200/05* (2013.01)

(58) Field of Classification Search
CPC .. A45B 9/00; A45B 2009/007; A45B 2200/05
See application file for complete search history.

(56) References Cited

U.S. PATENT DOCUMENTS

| | | |
|---|---|---|
| 2,705,015 A | 3/1955 | Langlais |
| 3,350,111 A | 10/1967 | Sahlein et al. |
| 3,378,272 A | 4/1968 | Lewis |
| D274,100 S | 6/1984 | Axton |
| 4,533,140 A | 8/1985 | Champion |
| D292,346 S | 10/1987 | Kolomeyer |
| D297,887 S | 10/1988 | Hattersley |
| 4,887,625 A | 12/1989 | Archer |
| D309,933 S | 8/1990 | Brown, Jr. |
| 5,036,873 A * | 8/1991 | Clayton .................... A61H 3/02 135/69 |
| D342,828 S | 1/1994 | Steinbach et al. |
| 5,351,703 A | 10/1994 | Moe et al. |
| 5,577,827 A | 11/1996 | Leffingwell et al. |
| 5,669,103 A * | 9/1997 | Hui .......................... B62B 1/125 280/655 |
| D396,742 S | 8/1998 | Raymond |
| 6,782,903 B1 * | 8/2004 | Jarman .................... F16B 7/105 135/65 |
| 2010/0254751 A1 * | 10/2010 | McMillan, III ...... A63C 11/221 403/109.1 |
| 2012/0145206 A1 | 6/2012 | Parry et al. |

(Continued)

FOREIGN PATENT DOCUMENTS

| | | |
|---|---|---|
| JP | 2011206149 | 10/2011 |
| JP | 3199705 | 9/2015 |
| JP | 2016168074 | 9/2016 |

*Primary Examiner* — Noah Chandler Hawk (74) *Attorney, Agent, or Firm* — Woods Oviatt Gilman LLP; Katherine H. McGuire, Esq.

(57) ABSTRACT

A height adjustable walking aid includes an outer tube and an inner tube slidably received within the outer tube. Adjustment is made using a, actuating assembly and pin assembly. Application of an actuation force upon the actuating assembly engages a translating member within the translating rod assembly to drive a lower pin travel block of the pin assembly from a first position to a second position. A pin then travels from an extended position to a retracted position such that the inner tube may slidably translate within the outer tube.

9 Claims, 7 Drawing Sheets

(56) References Cited

U.S. PATENT DOCUMENTS

2014/0053887 A1* 2/2014 Lee .................. A45B 9/04
  135/69
2015/0374081 A1* 12/2015 Wang ................ A45B 9/00
  135/75
2017/0224072 A1 8/2017 Van Varick et al.

* cited by examiner

HEIGHT ADJUSTABLE WALKING AID

FIELD OF THE INVENTION

The present invention relates to a walking aid, more particularly to a height adjustable walking aid, and still more particularly to an expandable and collapsible height adjustable walking aid that uses spring-actuated expansion and an internal latch mechanism to lock the walking aid at a desired height.

BACKGROUND OF THE INVENTION

Hikers and outdoor enthusiasts, as well as those with medical ailments such as back pain, leg pain or loss, Parkinson's disease, and those undergoing cancer treatments of who have visual impairment, frequently require the use of one or more walking aids for mobility assistance. A frequent initial option is the use of a walking cane. However, walking canes have limited length and may not provide adequate support and stability to the user. Thus, a user may then elect to use one or more hiking poles which tend to be longer than a typical walking cane. While adequate for general purposes, a user may still require a longer or shorter device on occasion. To address this, many hiking poles include a secondary grip just below the main grip to account for the need of a quick change in effective pole length during use. Alternatively, traditional hiking poles may use a twist-to-tighten/loosen mechanism to adjust the telescopic tubes to a desired length. This mechanism may be suitable for most users, but can be cumbersome for someone with arthritis, visual impairment, Parkinson's disease or anyone with hand dexterity issues. As a result, activities such as walking, hiking or traveling by cars or planes may be arduous where the pole length may have to be periodically adjusted, such that the pole turns into a nuisance as much as a benefit.

From the above, it is apparent that there is a need for a hiking/mobility aid device that offers quick and easy adjustability while also providing the desired support and stability. The present invention addresses these and other needs.

BRIEF SUMMARY OF THE INVENTION

In general, an embodiment the present invention is directed to an expandable and collapsible mobility/hiking pole that uses spring-actuated expansion and an internal latch mechanism to lock the pole at a desired height. The actuation may be implemented via a push button located near the top of the handle.

More specifically, in accordance with as aspect of the present invention, an exemplary embodiment may be directed to a height adjustable walking aid selectively positionable between a collapsed orientation, an elongate orientation and a plurality of intermediate orientations therebetween. The walking aid comprises an outer tube having a top end and a bottom end and defining a pin hole proximate the bottom end, and an inner tube slidably received within the outer tube. The inner tube has an inner tube wall defining a plurality of apertures therethrough. A translating rod assembly has a central fixed rod and a concentrically mounted translating member while an actuating assembly including an actuating button is located at the top end of the outer tube and is coupled to a first end of the translating member.

A pin assembly located at the bottom end of the outer tube and includes a pin, pin carrier block and a lower pin travel block. The pin is adapted to selectively reciprocally translate between an extended position wherein the pin engages a selected aperture of the plurality of apertures defined within the inner tube wall and the pin hole defined in the outer tube, and a retracted position wherein the pin disengages from each aperture of the plurality of apertures. The pin carrier block is fixedly mounted to a distal end of the central fixed rod and includes a pin bore dimensioned to slidably receive the pin therein. A lock pin passes through a lock pin aperture defined within the pin such that opposing ends of the lock pin are configured to travel within respective carrier slots defined within the pin carrier block.

The lower pin travel block is coupled to a second end of the translating member and defines travel slots therein. The opposing ends of the lock pin are further configured to travel within respective travel slots within the lower pin travel block. As a result, application of an actuation force upon the actuating button engages the translating member to drive the lower pin travel block from a first position to a second position whereby the lock pin travels in the travel slots and the carrier slots to move the pin from the extended position to the retracted position such that the inner tube slidably translates within the outer tube. To that end, the carrier slots may be disposed at an angle relative to the travel slots.

In a further aspect of the present invention, a handle portion may be mounted to the top end of the outer tube. The handle portion slidably secures the actuating button therein and may also include a button cover to prevent unwanted actuation of the actuating button.

In accordance with still another aspect of the present invention, the actuating assembly may further include a spring cap secured to the outer tube, a cap travel block, a button travel spring and at least one button post. The cap travel block defines a first bore dimensioned to receive the translating member therein, a second bore dimensioned for passage of the central fixed rod therethrough, and an outwardly extending flanged top wall. The button travel spring has a first end engaging the spring cap and a second end engaging a bottom surface of the flanged top wall of the cap travel block. The at least one button post is coupled at a first post end to the actuating button and to a top surface of the flanged top wall at a second post end. Application of the actuation force upon the actuating button drives the at least one button post against the cap travel block thereby charging the travel button spring with potential energy while also driving against the translating member to move the pin from the extended position to the retracted position.

In accordance with yet another aspect of the present invention, the pin assembly may further include a pin assembly spring between the pin carrier block and the lower pin travel block. The pin assembly spring biases the lower pin travel block to the first position. The translating rod assembly may still further include a lower bushing coupled to the pin carrier block and the inner tube. A height spring mounted between the spring cap of the actuating assembly and the lower bushing biases the outer tube and the inner tube from the collapsed orientation toward the elongate orientation when the pin is in the retracted position.

In another aspect of the present invention, each of the outer tube and the inner tube may define a generally D-shaped cross section having a curved portion and a planar portion. The planar portions are adjacent one another when the inner tube is received within the outer tube. Also, each of the plurality of apertures defined within the inner tube is located within the planar portion.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Referring to the drawings in detail, and specifically to FIGS. 1-4, a height adjustable walking aid (such as a walking stick or hiking pole) 100 generally includes an outer tube 102 and an inner tube 104 slidably received within outer tube 102. A handle portion 106 is mounted to top end 108 of outer tube 102 and is adapted for easy, comfortable grip by the aid user. As shown most clearly in FIG. 3, walking aid 100 includes an actuation assembly 110 having an actuating button 112 slidably secured within handle portion 106. An optional button cover 114 may also be provided to prevent unwanted or accidental actuation of actuation button 112, the operation of which will be discussed in greater detail below.

Figure 1:
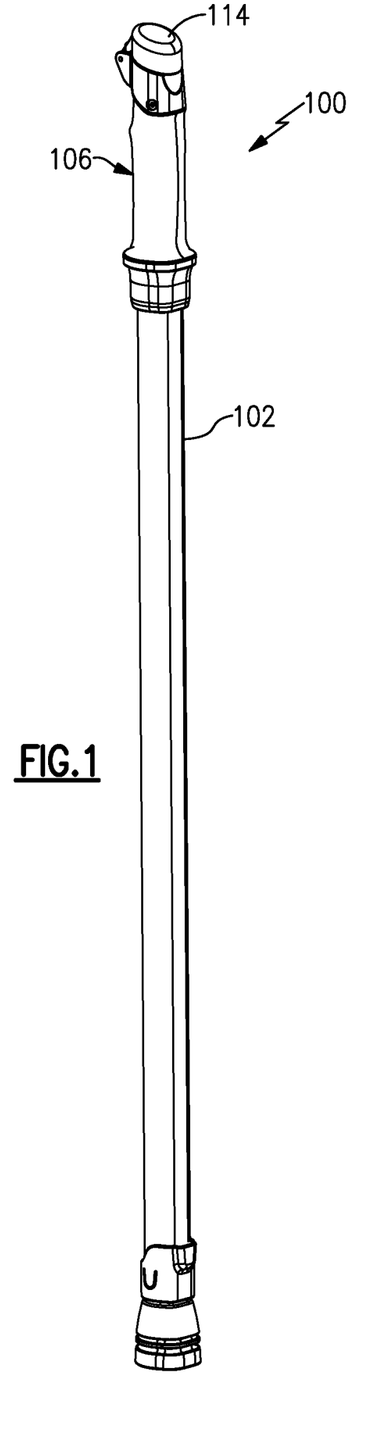
FIG. 1 is a front perspective view of an exemplary embodiment of a walking aid in accordance with an aspect of the present invention, with the walking aid in the collapsed orientation.
Figure 1A:
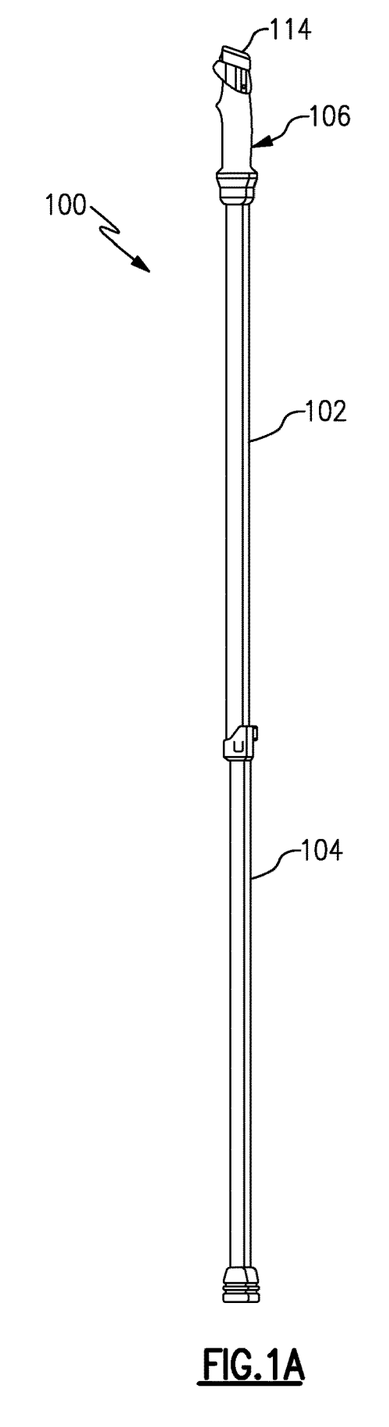
FIG. 1A is a side view of the exemplary walking aid shown in FIG. 1, with the walking aid in the elongate orientation.
Figure 1B:
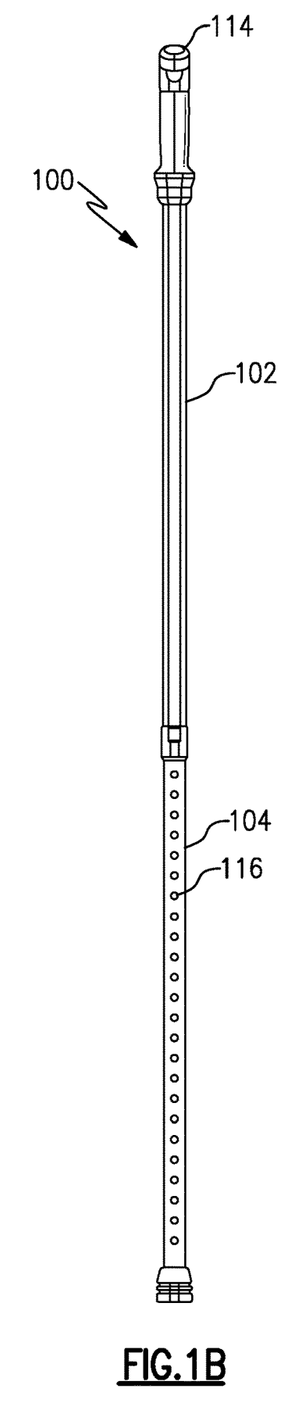
FIG. 1B is a rear view of the exemplary walking aid shown in FIG. 2, with the walking aid in the elongate orientation.
Figure 2:
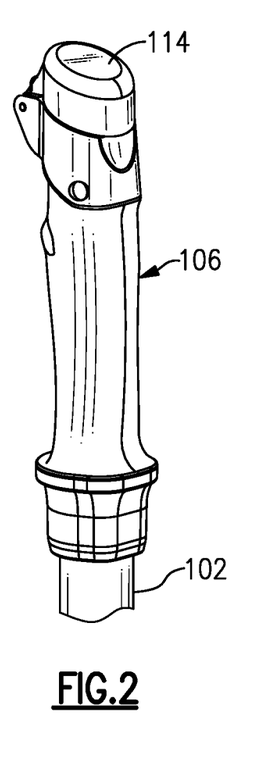
FIG. 2 is an expanded view of an exemplary handle portion of the walking aid shown in FIG. 1.
Figure 3:
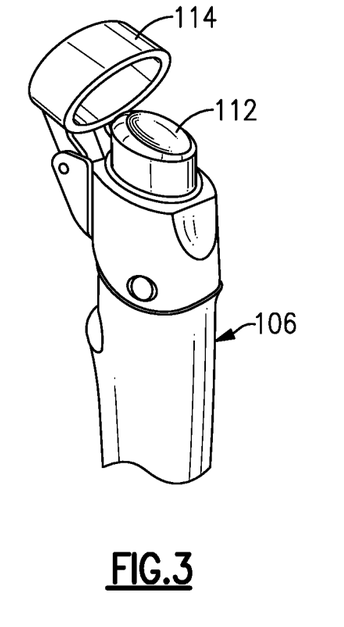
FIG. 3 is a further expanded view of the exemplary handle portion shown in FIG. 2, with the cover in the open position.
Figure 4:
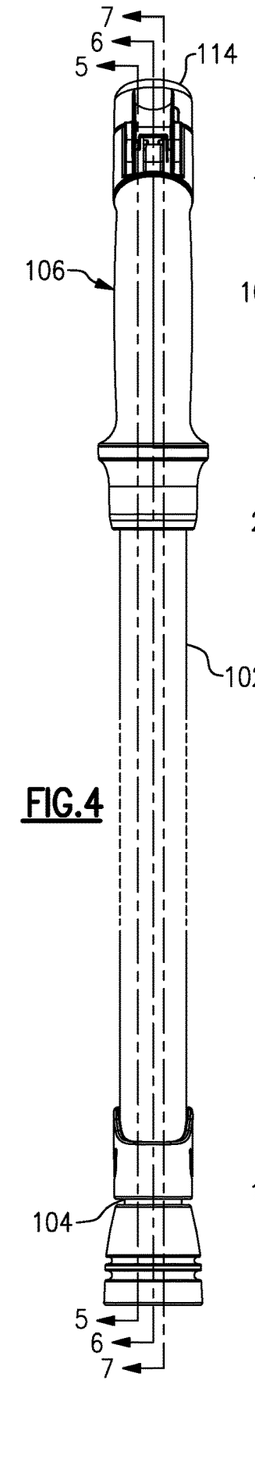
FIG. 4 is an expanded front view of the exemplary walking aid shown in FIG. 1.

As shown in FIG. 1, walking aid 100 may be in a collapsed orientation wherein inner tube 104 is completely (or substantially) resident within outer tube 102. With reference to FIGS. 1A and 1B, actuation (i.e., pushing or depressing) of actuation button 112 may allow inner tube 104 to extend outwardly of outer tube 102 in a fully elongate orientation (FIG. 1A) or any of a plurality of intermediate orientations as selected by the aid user, as will be discussed below.

Figures 5, 6:
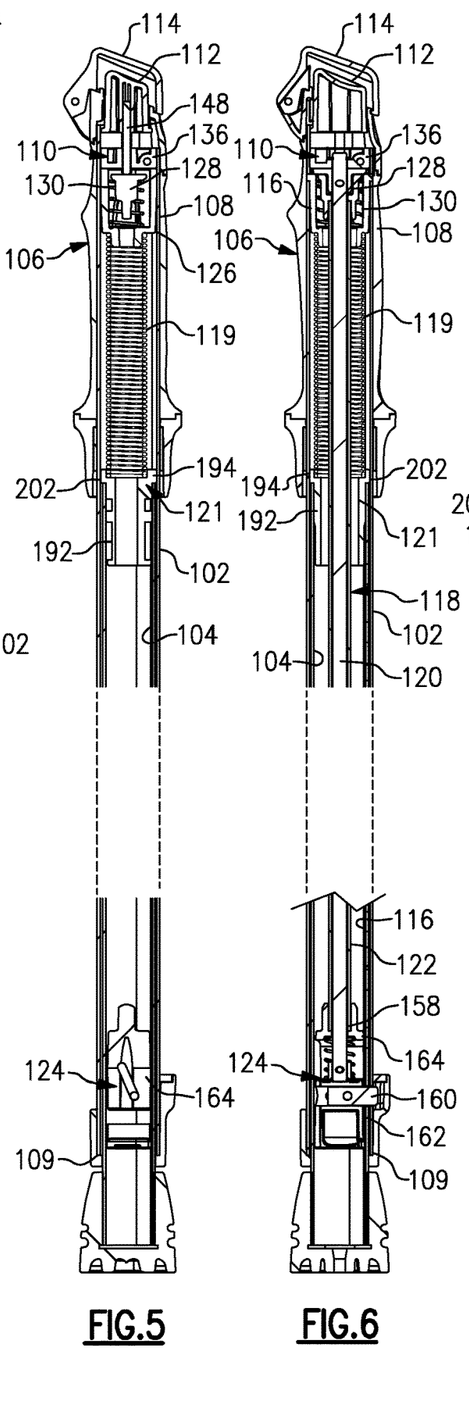
FIG. 5 is a cross section view of the exemplary walking aid taken generally along line 5-5 shown in FIG. 4.
FIG. 6 is a cross section view of the exemplary walking aid taken generally along line 6-6 shown in FIG. 4.
Figure 7:
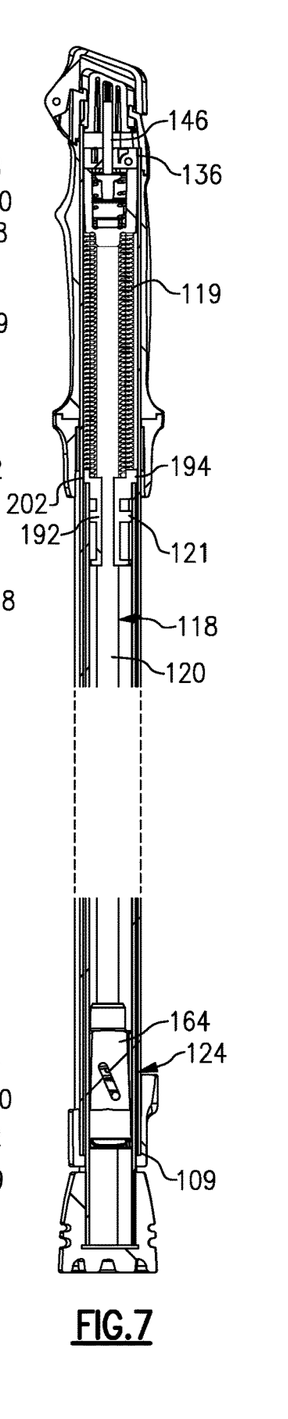
FIG. 7 is a cross section view of the exemplary walking aid taken generally along line 7-7 shown in FIG. 4.
Figure 8:
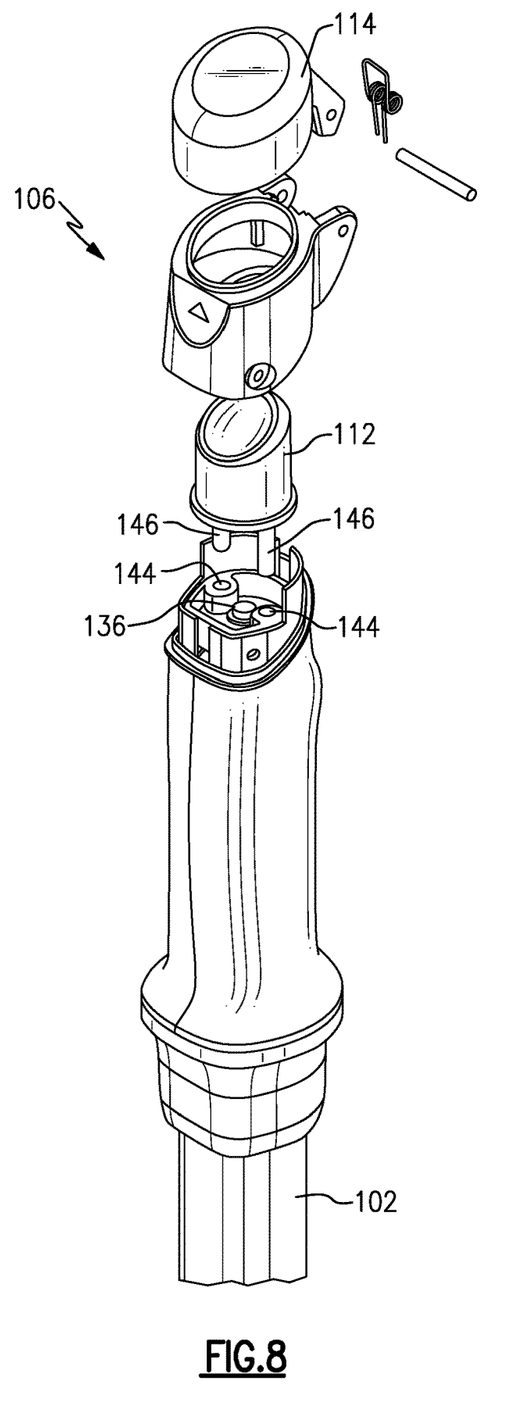
FIG. 8 is an exploded view of the exemplary handle portion shown in FIG. 2.
Figure 9:
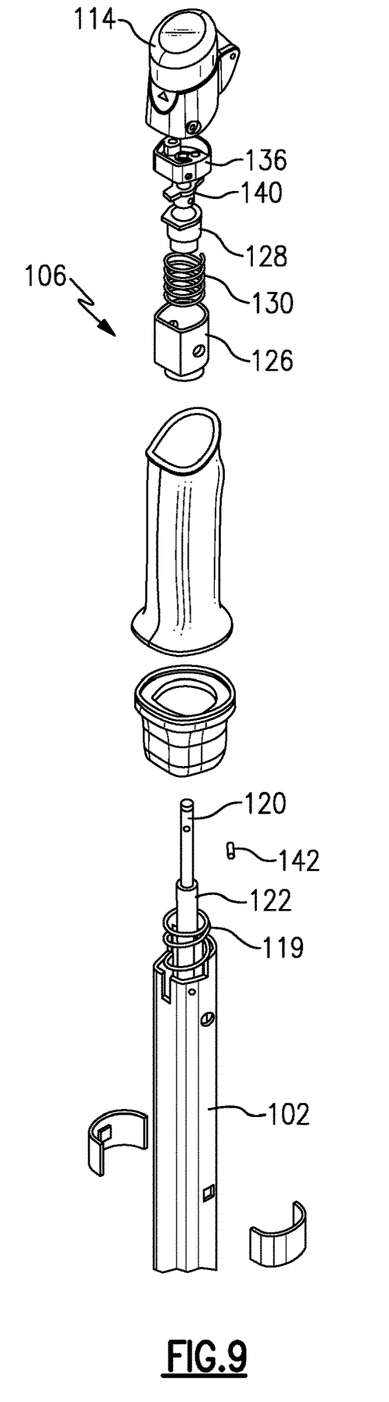
FIG. 9 is a further exploded view of the exemplary handle portion shown in FIG. 8.
Figure 10:
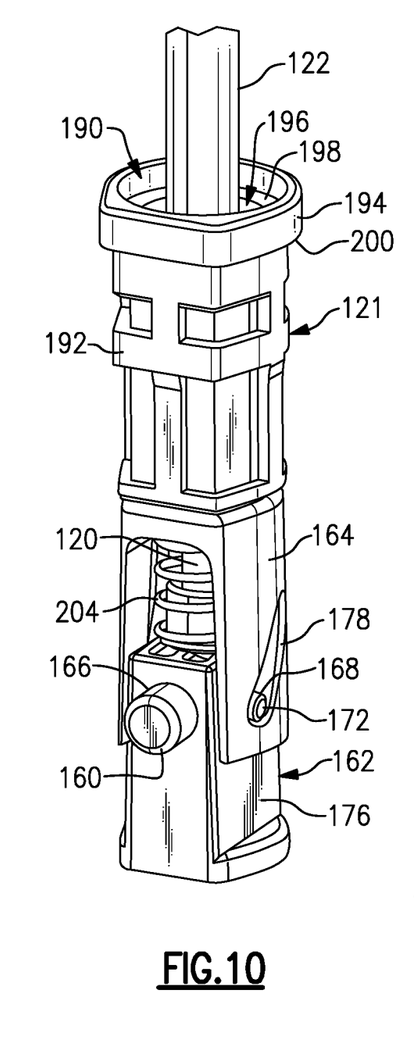
FIG. 10 is an expanded view of an exemplary pin assembly of the walking aid shown in FIG. 1.
Figure 11:
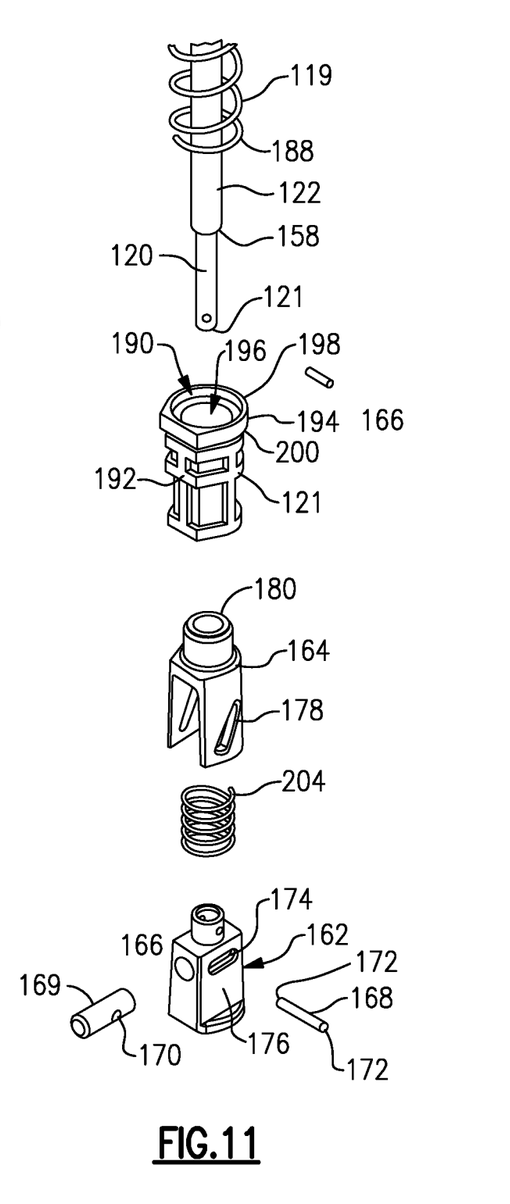
FIG. 11 is an exploded view of the exemplary pin assembly shown in FIG. 10.

With additional reference to FIGS. 5-7, walking aid 100 includes a translating rod assembly 118 having a central fixed rod 120 and a concentrically mounted translating member 122. Translating rod assembly 118 extends between actuation assembly 110 proximate top end 108 of outer tube 102 to pin assembly 124 proximate bottom end 109 of outer tube 102. Translating rod assembly 188 may further include height spring 119 and lower bushing 121, as will discussed in greater detail below. To effectuate translation of translating member 122, actuation assembly 110 may further include a spring cap 126, cap travel block 128 and a button travel spring 130, as shown in FIGS. 6 and 8-9.

Figure 12:
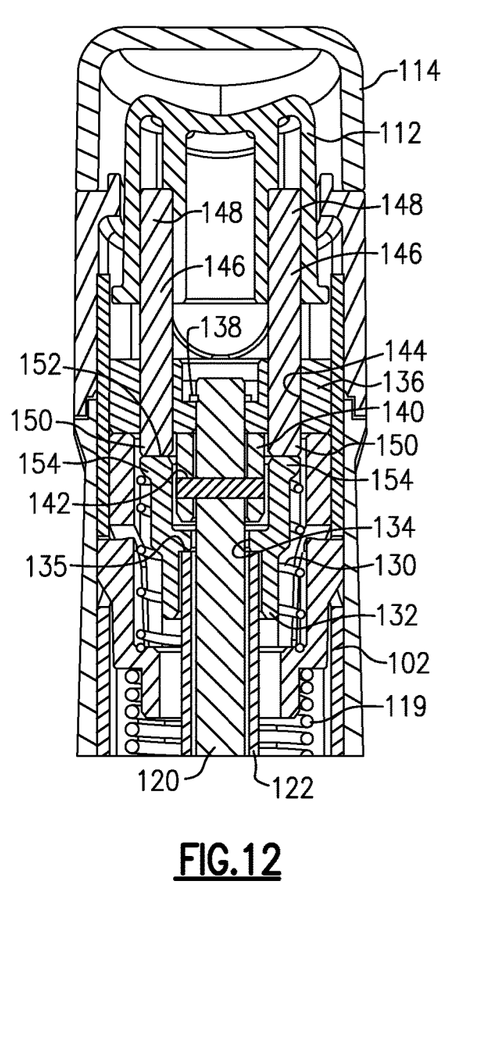
FIG. 12 is an expanded cross-section view of an exemplary actuation assembly of the walking aid shown in FIG. 1, in the rest position.
Figure 13:
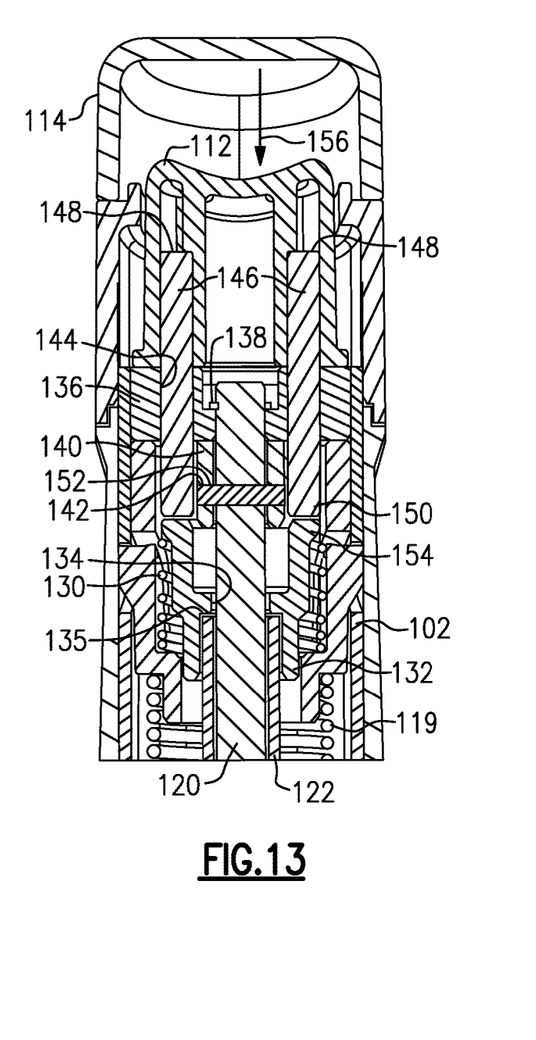
FIG. 13 is an expanded cross-section view of then exemplary actuation assembly shown in FIG. 12, after application of an actuation force.
Figure 14:
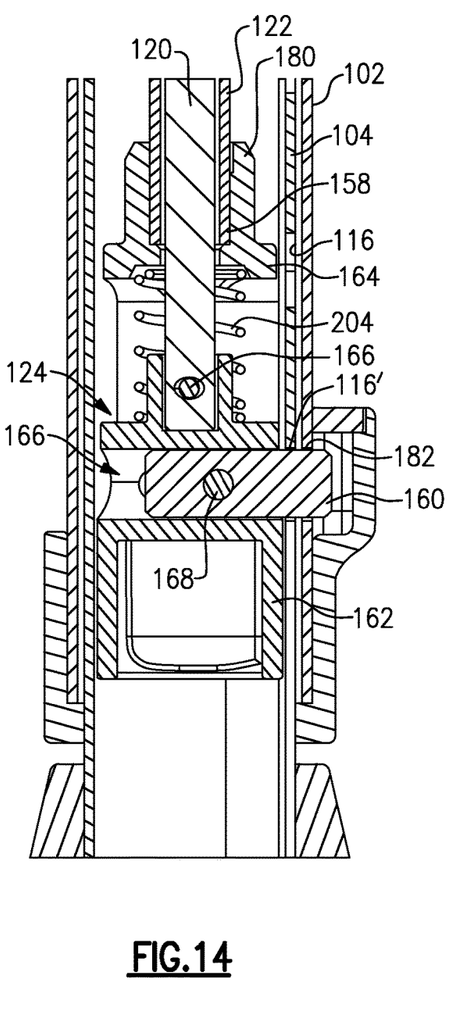
FIG. 14 is an expanded cross-section view of the exemplary pin assembly shown in FIG. 10, in the rest position.
Figure 15:
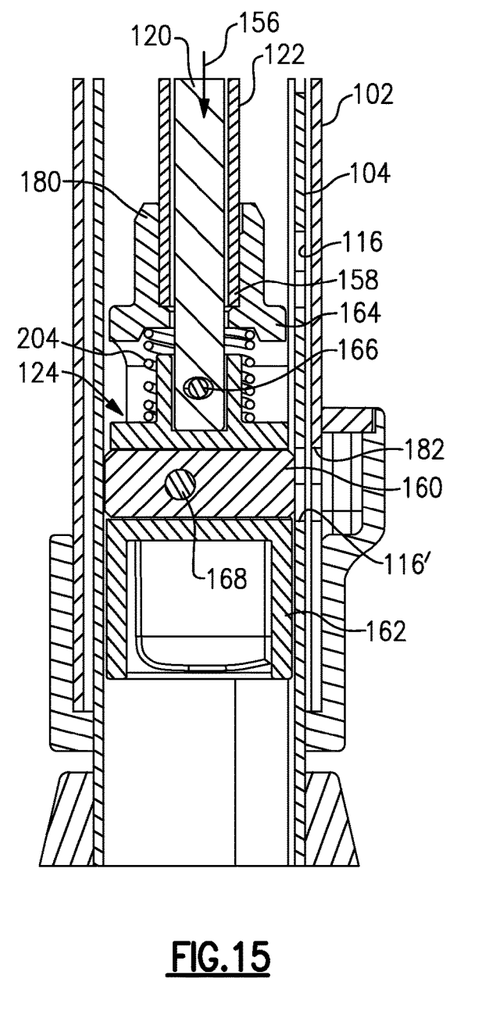
FIG. 15 is an expanded cross-section view of then exemplary pin assembly shown in FIG. 14, after application of an actuation force.

With additional reference to FIGS. 12 and 13, cap travel block 128 defines a first bore 132 which is dimensioned to receive translating member 122 therein and a second bore 134 which allows passage of central fixed rod 120 therethrough, such that first bore 132 and second bore 134 create an annular step 135 therebetween. Central fixed rod 120 may then be secured to outer tube 102 via a fixed rod cap 136 and retaining clip 138, along with fixed rod stop 140 and pin 142.

Fixed rod cap 136 may further define one or more through bores 144 dimensioned to slidably receive a respective button post 146 therethrough. First end 148 of button post 146 is coupled to actuation button 112 while second end 150 is coupled to top surface 152 of flanged top wall 154 of cap travel block 128. Thus, as shown in FIG. 13, application of an actuation force (generally in a downward direction designated by arrow 156, such as through use of a thumb or finger) to actuation button 112 drives button post 146 against cap travel block 128. Annular step 135 of cap travel block 128 may then engage translating member 122 so as to drive translating member 122 in the direction of the actuation force (i.e., downward as indicated by arrow 156).

Downward translation of cap travel block 128 also operates to compress button travel spring 130 between flanged top wall 154 and spring cap 126, thereby storing potential energy within button travel spring 130. Upon release of force against actuation button 112, the stored potential within button travel spring 130 exerts a reverse biasing force against flanged top wall 154, thereby returning cap travel block, button post 146, actuation button 112 and button travel spring 130 to their original rest positions (as shown in FIG. 12).

Returning now to FIGS. 5-7, along with FIGS. 10-11 and 14-15, the downward travel of translating member 122, upon application of actuation force 156 described above, causes distal end 158 of translating member 122 to engage pin assembly 124. To that end, pin assembly 124 includes a pin 160, pin carrier block 162 and lower pin travel block 164. Pin carrier block 162 is secured to distal end 121 of central fixed rod 120, such as via a mounting pin 166. Pin 160 is slidably mounted within pin bore 166 defined by pin carrier block 162. Lateral travel of pin 160 is confined by lock pin 168 inserted within lock pin aperture 170 with lock pin ends 172 reciprocally traveling within respective carrier slots 174 defined within sidewalls 176 of pin carrier block 162.

Lower pin travel block 164 is slidably mounted to pin carrier block 162, with lower pin travel block 164 defining travel slots 178 which are also configured to receive lock pin ends 172 therein. Travel slots 178 are oriented at an angle with respect to carrier slots 174. In one aspect of the present invention, carrier slots are generally horizontally oriented with travel slots 178 angled thereto when walking aid 100 is held vertically. Top portion 180 of lower pin travel block 164 engages distal end 158 of translating member 122. With additional reference to FIGS. 14 and 15, as translating member 122 is driven downward, as described above, distal end 158 drives against top portion 180 such that lower pin travel block 164 is also driven downward. As lower pin travel block 164 moves downwardly, pin 160 travels within carrier slots 174 and travel slots 178. Because carrier slots 174 and travel slots 178 are oriented at an angle, pin 160 is drawn into pin carrier block 162 (see FIG. 15). Drawing pin 160 into pin carrier block 162 unencumbers pin hole 182 defined within outer tube 102 (and, optionally, selected aperture 116' within inner tube 104). With pin hole 182 clear of pin 160, outer tube 102 and inner tube 104 may then be slidably translated with respect to one another so as to extend or shorten the length of walking aid 100, as desired.

With reference to FIGS. 5-7 and 12-15, once pin hole 182 is unencumbered of pin 160, height spring 119 may bias walking aid 100 from the collapsed orientation (FIG. 1) toward the elongate orientation (FIG. 1A). To that end, a first end 184 of height spring 119 may be seated against bottom end 186 of spring cap 126 while the opposing second end 188 of height spring 119 seats within a recess 190 of lower bushing 121. Lower bushing 121 may generally comprise a bushing body 192 and outwardly extending upper collar 194. A central bore 196 is dimensioned to allow passage of central fixed rod 120 and translating member 122 therethrough. Bushing body 192 is dimension to be snuggly received within inner tube 104 while upper collar 194 is dimension to be received within outer tube 102. Bushing body 192 and upper collar 194 form an inner step 198 which, together, define recess 190. Bushing body 192 and upper collar 194 further form an outer step 200 having an outer periphery slightly smaller than the internal dimensions of outer tube 102. Outer step 200 may then seat upon top edge 202 of inner tube 104. Thus, as spring cap 126 is fixedly secured to outer tube 102, retraction of pin 160 from pin hole 182 in outer tube 102 may decompress height spring 119 such that height spring 119 may bias walking aid 100 toward the elongate orientation.

Pin 160 remains retracted within pin carrier block 162 so long as actuation force 156 is applied to actuation button 112. As described above, release of actuation force 156 causes the potential energy stored within button travel spring 130 to exert a biasing force against flanged top wall 154, thereby returning cap travel block, button post 146, actuation button 112 and button travel spring 130 to their original rest positions as shown in FIG. 12. Similarly, pin assembly 124 may also include a pin assembly spring 204 located between pin carrier block 162 and lower pin travel block 164. Thus, when lower pin travel block 164 is driven downward by translating member 122, potential energy is stored within pin assembly spring 204. Upon release of actuation force 156, the potential energy stored within pin assembly spring 204 may the bias lower pin travel block 164 upward until lower pin travel block 164 returns to its original position (see FIG.14). The upward travel of lower pin travel block 164 operates to reverse translate translating member 122 upward because translating member 122 is no longer forcibly engaged by button post 146. Upward travel of lower pin travel block also operates to drive pin 160 outwardly of pin carrier block 162 such that pin 160 may engage an aperture 116 in inner tube 104, and, when properly corresponding, with pin hole 182 in outer tube 102 so as to lockingly set walking aid 100 at the selected length.

To shorten walking aid 100, i.e., adjust length from an intermediate or the elongate orientation toward or to the collapsed orientation, an actuation force is applied to actuation button 112 to retract pin 160 from pin hole 182 as described above. With pin hole 182 unencumbered, inner tube 104 may be slidably directed into outer tube 102 while compressing height spring 119. The actuation force may then be removed whereby pin 160 will be directed to the extended position and pass through a newly selected aperture 116' and pin hole 182 to lock walking aid 100 at the selected shortened length.

It should be noted that while the above exemplary embodiments included a walking aid having an outer tube with a pin hole and an inner tube with a plurality of apertures, additional embodiments may include an outer tube with a plurality of apertures and an inner tube with a pin hole, and that such alternative embodiments are part of the instant application.

Although the present invention has been described in considerable detail with reference to certain aspects thereof, other versions are possible. Therefore, the spirit and scope of the appended claims should not be limited to the description of the aspects contained herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A height adjustable walking aid selectively positionable between a collapsed orientation, an elongate orientation and a plurality of intermediate orientations therebetween, comprising:
   a) an outer tube having a top end and a bottom end and defining a pin hole proximate said bottom end;
   b) an inner tube slidably received within said outer tube, said inner tube having an inner tube wall defining a plurality of apertures therethrough;
   c) a translating rod assembly having a central fixed rod and a concentrically mounted translating member;
   d) an actuating assembly including an actuating button located at said top end of said outer tube and coupled to a first end of said translating member; and
   e) a pin assembly located at said bottom end of said outer tube and comprising:
      i) a pin adapted to selectively reciprocally translate between an extended position wherein said pin engages a selected aperture of said plurality of apertures defined within said inner tube wall and said pin hole defined in said outer tube, and a retracted position wherein said pin disengages from said pin hole defined in said outer tube;
      ii) a pin carrier block fixedly mounted to a distal end of said central fixed rod, wherein said pin carrier block includes a pin bore dimensioned to slidably receive said pin therein and a lock pin passing through a lock pin aperture defined within said pin, wherein opposing ends of said lock pin are configured to travel within respective carrier slots defined within the pin carrier block; and iii) a lower pin travel block coupled to a second end of said translating member, wherein said lower pin travel block defines travel slots therein, wherein said opposing ends of said lock pin are further configured to travel within respective travel slots within said lower pin travel block, wherein application of an actuation force upon said actuating button engages said translating member to drive said lower pin travel block from a first position to a second position whereby said lock pin travels in said travel slots and said carrier slots to move said pin from said extended position to said retracted position such that said inner tube slidably translates within said outer tube.

2. The height adjustable walking aid of claim 1, further including a handle portion mounted to said top end of said outer tube, wherein said handle portion slidably secures said actuating button therein.

3. The height adjustable walking aid of claim 2, wherein said handle portion includes a button cover to prevent unwanted actuation of said actuating button.

4. The height adjustable walking aid of claim 1, wherein said actuating assembly further includes:

i) a spring cap secured to said outer tube;
ii) a cap travel block defining a first bore dimensioned to receive said translating member therein, a second bore dimension for passage of said central fixed rod therethrough and an outwardly extending flanged top wall;
iii) a button travel spring having a first end engaging said spring cap and a second end engaging a bottom surface of said flanged top wall of said cap travel block; and
iv) at least one button post coupled at a first post end to said actuating button and to a top surface of said flanged top wall at a second post end, wherein said application of said actuation force upon said actuating button drives said at least one button post against said cap travel block thereby charging said travel button spring with potential energy while also driving against said translating member to move said pin from said extended position to said retracted position.

5. The height adjustable walking aid of claim 4, wherein said pin assembly further includes a pin assembly spring between said pin carrier block and said lower pin travel block, said pin assembly spring biasing said lower pin travel block to said first position.

6. The height adjustable walking aid of claim 4, wherein said translating rod assembly further includes a lower bushing coupled to said pin carrier block and said inner tube, and a height spring mounted between said spring cap of said actuating assembly and said lower bushing, wherein said height spring biases said outer tube and said inner tube from the collapsed orientation toward the elongate orientation when said pin is in said retracted position.

7. The height adjustable walking aid of claim 1, wherein each of said outer tube and said inner tube define a generally D-shaped cross section having a curved portion and a planar portion, wherein said planar portions are adjacent one another when said inner tube is received within said outer tube.

8. The height adjustable walking aid of claim 7, wherein said plurality of apertures defined within said inner tube are located within said planar portion.

9. The height adjustable walking aid of claim 1, wherein said carrier slots are disposed at an angle relative to said travel slots.

* * * * *